May 28, 1968     G. OTTERBACH ET AL     3,385,332
DEVICE FOR REMOVING BRANCHES FROM THE TRUNK OF A TREE
Filed Feb. 21, 1966     2 Sheets-Sheet 1

INVENTORS
Gerd Otterbach
Reinhard Kessler
By: Low and Berman
Agents

INVENTORS
Gerd Otterbach and Reinhard Kessler
By: Lew and Berman
Agents

United States Patent Office 3,385,332
Patented May 28, 1968

3,385,332
DEVICE FOR REMOVING BRANCHES FROM THE TRUNK OF A TREE
Gerd Otterbach and Reinhard Kessler, Schweinfurt, Germany, assignors to Fichtel & Sachs A.G., Schweinfurt, Germany
Filed Feb. 21, 1966, Ser. No. 528,754
Claims priority, application Germany, Feb. 26, 1965, F 45,360
8 Claims. (Cl. 144—2)

This invention relates to forestry equipment, and particularly to automatic apparatus for removing or lopping branches from the trunks of standing, living trees to a certain height from the ground.

It is known to remove branches from the lower trunk portions of standing or living trees by means of motorized devices which travel over the upright surface of the tree in a helical path and trim branches or other projections from the tree surface in order to reduce the number and size of defects in the lumber eventually produced from the tree. Circular saws or chain saws are commonly employed on such devices, and inherently tend to cut a planar kerf. Because of the circumferential component of cutting tool movement while supporting structure moves in a helix about the tree, the cutting tool is subjected to transverse or bending stresses which may cause jamming or damage to the tool. The magnitude of the stresses and the probability of jamming are direct functions of the thickness of the branch to be lopped off and inverse functions of the trunk diameter.

The primary object of the invention is the provision of a device of the type described for removing branches from trunks of standing trees in which the afore-mentioned transverse or bending stresses can be held to a controlled minimum, and whose operation is free of the jamming hazard inherent in known apparatus of the same type.

With this object and others in view, as will hereinafter become apparent, the invention provides a branch removing device of the afore-described type with sensing means which sense the resistance encountered by the saw to its cutting movement through a branch while the device moves in its helical path about the tree, and reduces the speed at which the device advances in its path in response to the sensed resistance.

The resistance to cutting movement is closely related to the afore-mentioned stresses which may cause jamming or tool damage, and the apparatus of the invention therefor avoids the shortcomings of the prior art. When the advance of the device is slowed or stopped, the saw is able to overcome the resistance of a particularly heavy or hard branch without suffering damage.

Other objects and features of the invention will become apparent to those skilled in the art as the disclosure is made in the following detailed description of a preferred embodiment of the invention as illustrated in the accompanying drawing in which.

Figure 1:
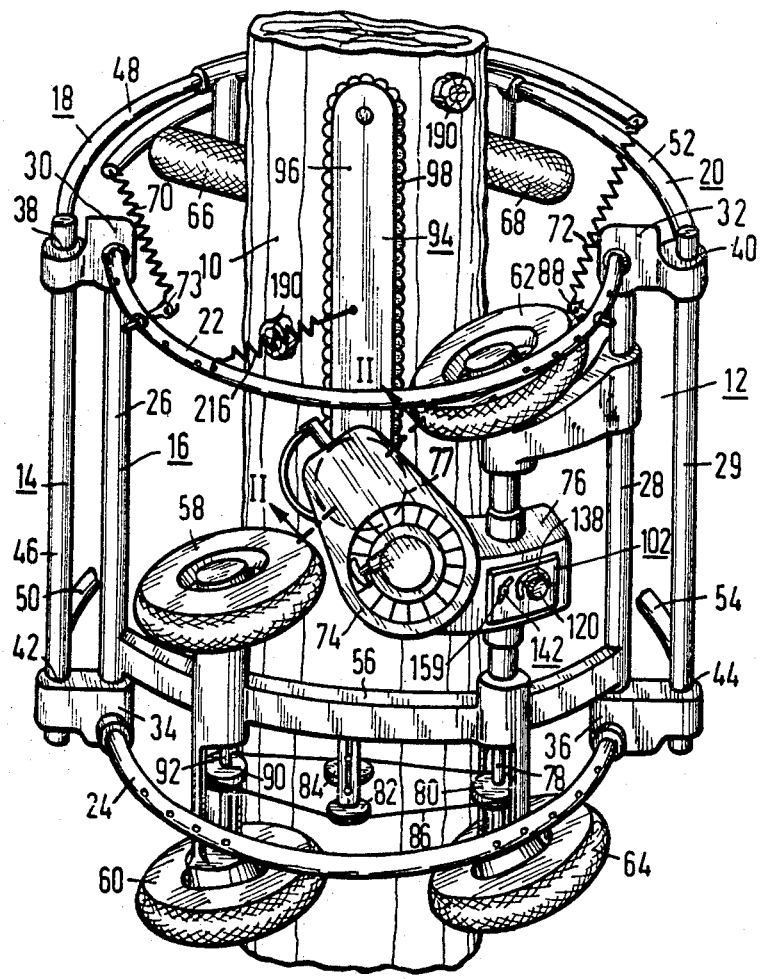
FIG. 1 shows a branch removing device of the invention in operative position on a partially shown tree trunk in perspective view, portions of the apparatus being broken away for the sake of clarity.

Referring now to the drawing in detail, and initially to FIG. 1, there is seen a portion of an upright tree trunk 10 on which a branch removing device 12 is arranged in its operative position. The operating elements of the device are mounted on a supporting annular frame 14 consisting mainly of three parts 16, 18, 20 which are circumferentially offset about the common axis of the tree and of the device, the frame parts 18, 20 being hingedly attached to the central frame part 16.

The frame part 16 includes two axially spaced arcuate bars 22, 24 extending in respective radial or horizontal planes and two circumferentially spaced axial or vertical rods 26, 28. The bars and rods are fixedly fastened to each other by connectors 30, 32, 34, 36 each of which has an integral bearing lug 38, 40, 42, 44.

The frame part 18 is constituted by a vertical rod 46 journaled in the bearing lugs 38, 42 and by two identical and identically arranged horizontal arcuate bars 48, 50, fixedly attached to the ends of the rod 46, the bar 50 and associated elements being partly omitted for the sake of clarity. The frame part 20 is similarly constituted by a vertical rod 29 journaled in the bearing lugs 40, 44, and arcuate bars 52, 54 fixedly attached to the ends of the rod 29, the lower bar 54 again being partly omitted.

The drive and the cutting device of the apparatus are mounted on an inner frame 56 attached to the rods 26, 28 of the central frame part 16. The drive includes two pairs of wheels 58, 60, 62, 64. The drive wheels cooperate with idler or guide wheels 66, 68 on the upper bars 48, 52 of the frame parts 18, 20 and similar, non-illustrated wheels on the omitted portions of the lower bars 50, 54. All wheels are inclined at the same angle relative to the axis of the tree trunk, and are held in engagement with the bark or surface of the trunk 10 by helical tension springs 70, 72 which connect the free ends of the bars 48, 52 to hooks 73, 88 secured to the bar 22 by engagement with openings in the bar 22 arranged in longitudinal rows so as to permit the frame 14 to be expanded and contracted as needed to hold the wheels in resilient engagement with the trunk 10. It will be understood that the bars 50, 54 are biased toward the tree trunk 10 by non-illustrated springs in the same manner as explicitly illustrated with reference to bars 48, 52.

The wheels on the inner frame 56 are driven by a conventional single-cylinder internal combustion engine 74 whose crankshaft is connected to a drive shaft 78 by a transmission enclosed in two housings 76, 77. Bevel gears, not themselves shown, connect the shaft 78 to the wheels 62, 64. The part of the transmission enclosed in the housing 76 is equipped with a control device 102 of which only an adjusting knob 120, the setting member of a stopping mechanism 142 and associated scales 138, 159 are visible in FIG. 1.

The drive wheels 58, 60 are connected to the drive shaft 78 by a belt 86 trained over a drive pulley 80 on the shaft 78, two guide pulleys 82, 84, and a driven pulley 90 on the common drive shaft 92 of the wheels 58, 60, the last-mentioned wheels being connected to the shaft 92 bevel gears, not shown.

The engine 74 also provides motive power for a chain saw 94 which includes a guide bar 96 pivotally attached to the housing 77 and a saw chain 98 which is trained in a conventional manner about a sprocket, not visible in FIG. 1 and the nose of guide bar 94. The sprocket is connected with the engine 74 by the section of the transmission enclosed in the housing 77. A helical compression spring 216 interposed between the guide bar 96 and the frame 14 urges the guide bar 94 to pivot clockwise on the housing 77, as viewed in FIG. 1, whereby the cutting portions of the saw chain 98 are moved forward in the helical path of the device during its upward movement on the trunk 10 when it removes branches 190 from the trunk.

Figure 2:
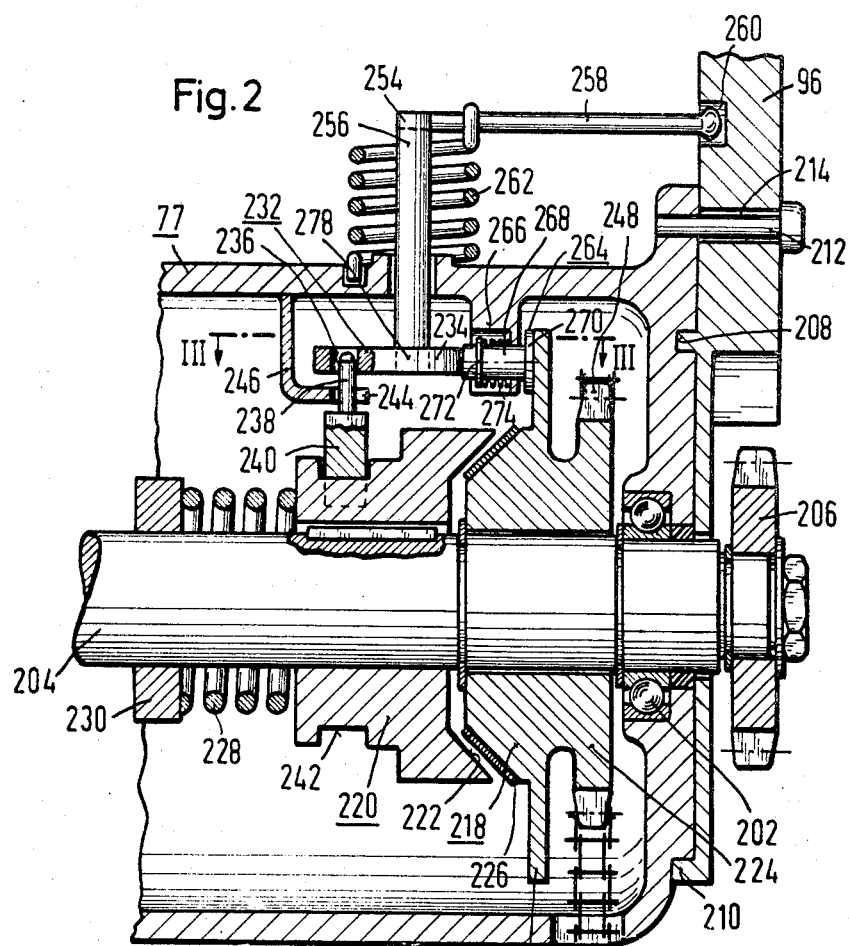
FIG. 2 shows a detail of the apparatus of FIG. 1, mainly in elevational section on the line II—II, and partly diagrammatically.

The section of the transmission in the housing 77 and associated elements are shown in more detail in FIG. 2. A shaft 204 which is the output member of a non-illustrated gear train conventionally connected to the crankshaft of the engine 74, is supported in the housing 77 by ball bearings 202 of which only one is shown. A portion of the shaft 204 projecting outward from the housing 77 carries the sprocket 206 over which the saw chain 98 is normally trained. A circular groove 208 in the outer face of the housing 77 about the axis of the shaft 204 slidably receives a circular flange 210 on that portion of the guide bar 96 which is obscured by the housing 77 in FIG. 1, and the shaft 204 freely passes through an opening in the bar 96. A headed pin 212 projects from the housing 77 into an arcuate slot 214 in the bar 96 which is centered in the axis of the shaft 204. The pin 212 limits the pivoting movement of the guide bar 96 on the housing 77, and axially secures the bar.

A friction clutch 218 is interposed between the shaft 204 and the drive shaft 78. The clutch includes an axially movable, annular input member 220 coaxially mounted on the shaft 204 and secured thereon against rotation, and an annular output member 224 which is rotatably mounted on the shaft 204, but secured against axial movement thereon. The clutch member 220 has an inner conical face 222, and the clutch member 224 has a corresponding outer face covered with a friction facing 226. The two clutch faces are normally held in engagement by a heavy compression spring 228 coiled about the shaft 204 and axially interposed between the clutch member 220 and a fixed collar 230 on the shaft.

Figure 3:
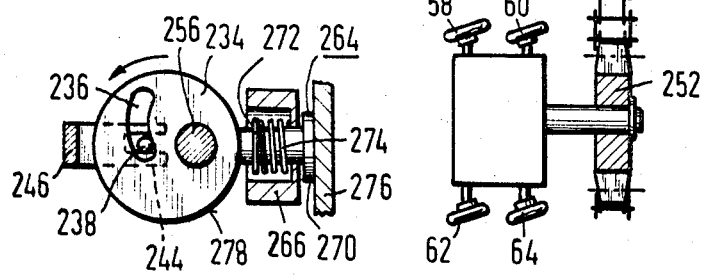
FIG. 3 shows a portion of the device of FIG. 2 in section on the line III—III, but in different operative position.

The clutch 218 is shown in FIG. 2 to be disengaged by a release mechanism 232 some of whose elements are better seen in a different operative position in FIG. 3. The control member of the release mechanism is a circular disc 234 accentrically mounted on a shaft 256 journaled in the housing 77 and projecting outward therefrom.

An arcuate cam slot 236 in the disc 234 extends along a spiral relative to the axis of the shaft 256 and receives a pin 238 on a clutch release fork 240 which rotatably engages an annular groove 242 in the clutch member 220. The pin 236 is guided along the shaft 204 and prevented from rotating about the shaft by the forked end 244 of an arm 246 fixedly mounted on the housing 77.

A sprocket 248 integral with the clutch output member 224 engages a drive chain 250 which is also trained over a sprocket 252 associated with the section of the transmission enclosed in the housing 76, and connected with the drive shaft 78 in a conventional manner, not further illustrated, for driving the wheels 58, 60, 62, 64 when the clutch 218 is engaged.

The clutch release mechanism 232 is connected with the guide bar 96 by a sensing mechanism 254 which senses the angular position of the bar relative to the axis of the shaft 204. The sensing mechanism includes an arm 258 attached to the portion of the shaft 256 outside the housing 77 and extending from the shaft in an approximately radial direction into a recess 260 of the guide bar 96. A torsion spring 262 coiled about the shaft 256 tends to turn the shaft 256 counterclockwise, as viewed in FIG. 3, and thereby to pivot the bar 96 about the axis of the shaft 204 in cooperation with the afore-mentioned compression spring 216.

The peripheral circular cam face 278 of the disc 234 operates a brake 264 which includes a cam follower pin 268 slidable in a boss 266 on the inner wall of the housing 77. The end of the pin 268 remote from the cam face 278 carries a brake shoe 270, and the other end is held in engagement with the cam face by a compression spring 274 interposed between a collar 272 of the pin and a surface of the boss 266. An integral flange 276 on the clutch output member 224 has an annular face which is axially aligned with the brake shoe 270.

The afore-described apparatus operates as follows:

When the engine 74 is started, the shaft 204 normally transmits power to the wheels 58, 60, 62, 64 by means of the clutch 218 and the drive chain 250. The saw chain 98 is simultaneously driven by the sprocket 206. The guide bar 96 is held by the springs 216 and 262 in a terminal angular position shown in FIG. 1 in which further clockwise pivoting movement, as viewed in FIG. 1, is prevented by abutment of the pin 212 against an end wall in the slot 214. The corresponding position of the control disc 234 is shown in FIG. 3.

When the cutting movement of the chain 94 encounters only minor resistance from branches 190 being cut while the frame 14 moves in a helical upward path, the angular position of the guide bar 96 relative to the axis of the shaft 204 remains unchanged. When a very heavy branch is to be cut, the resistance to saw movement through the branch becomes sufficient to overcome the restraint of the springs 216, 262, and to pivot the bar 96 counterclockwise, as viewed in FIG. 1, whereby the disc 234 is turned in the direction of the arrow in FIG. 3.

The pin 238 thereby is moved along a wall of the cam slot 236 which causes the pin 238, the clutch fork 240, and the input member 220 of the clutch to move toward the left, as viewed in FIGS. 2 and 3. The clutch slips, and is entirely disengaged if the guide bar 96 is sufficiently deflected by the resistance of the branch to the cutting movement of the saw 94. The drive wheels 58, 60, 62, 64 are correspondingly slowed or entirely cut off from their source of motive power.

Engagement of the eccentric cam face 278 with the pin 268 of the brake 264 simultaneously causes the brake shoe 270 to be pressed against the flange 276 of the clutch output member 224 with a force which increases with increasing deflection of the guide bar 96. The brake 264 assists in slowing and ultimately stopping the drive wheels, but it also prevents the device from descending along the tree trunk 10 when power is shut off from the wheels.

Movement of the saw chain 98 continues unchanged while the movement of the entire device in its helical path is slowed or stopped. At the resulting reduced feeding rate, the saw can readily cut itself free and can thereafter resume its initial angular position, whereby the disc 234 is returned to the position shown in FIG. 3, and the clutch 218 is again engaged.

The height to which the device will ascend on a tree trunk to be cleared of lower branches can be controlled by the mechanism 102 in a manner not directly relevant to this invention, and described in more detail in our copending application Ser. No. 547,300. The maximum cutting level is simply set by turning the knob 120 to a desired position relative to the scale 238. When the device reaches the level set, the direction of rotation of the drive wheels is reversed, and the device descends to a position just above the ground which may be set by means of the setting member 142 on the scale 259. The chain saw 94 runs idle during the downward movement of the device, and the clutch 218 remains engaged.

It should be understood, of course, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. A device for removing branches from the trunk of a tree comprising, in combination:
   (a) a support;
   (b) guide means for guiding said support in a substantially helical path about the trunk of a tree;
   (c) drive means for moving said support in said path;
   (d) cutting means mounted on said support for engagement with a branch projecting from said trunk toward said path and for cutting movement of said cutting means through said branch when said support moves in said path;
   (e) sensing means operatively connected to said cutting means for sensing the resistance to said cutting movement encountered by said cutting means; and (f) control means operatively connected to said drive means and to said sensing means for reducing the speed of movement of said support in response to the sensed resistance.

2. A device as set forth in claim 1, further comprising a motor; first motion transmitting means interposed between said motor and said drive means; second motion transmitting means interposed between said motor and said cutting means, said control means being operatively connected to said first motion transmitting means for reducing said speed.

3. A device as set forth in claim 2, wherein said first motion transmitting means include clutch means, and said control means include clutch disengaging means connected to said clutch means for disengaging the same in response to said resistance.

4. A device as set forth in claim 1, wherein said cutting means include a cutting tool mounted on said support for limited movement relative thereto in the direction of said path, and yieldably resilient means urging said tool to move forward in said direction, said sensing means sensing the movement of said tool against the urging of said resilient means.

5. A device as set forth in claim 4, wherein said tool is a chain saw including a sprocket mounted on said support for rotation about an axis transverse of said path, a guide bar mounted on said support for pivoting movement about said axis and having a nose portion remote from said axis, and a saw chain trained over said sprocket and said nose portion, said resilient means urging said guide bar to pivot in said direction about said axis.

6. A device as set forth in claim 5, further comprising a motor connected to said sprocket for joint movement, and clutch means interposed between said motor and said drive means, said control means including clutch disengaging mans responsive to the movement of said guide bar for disengaging said clutch means.

7. A device as set forth in claim 1, further comprising a motor, clutch means operatively interposed between said motor and said drive means, said control means including clutch disengaging means connected to said clutch means for disengaging the same, and brake means operatively connected to said drive means for braking said drive means when the resistance sensed by said sensing means exceeds a predetermined value.

8. A device as set forth in claim 7, wherein said control means include a control member connected to said sensing means for movement in response to the sensed resistance, and motion transmitting means interposed between said control member, said clutch means and said brake means for simultaneous operation of the clutch means and brake means by said control member.

References Cited

UNITED STATES PATENTS 3,315,714   4/1967   Meier _____ 144—2 XR

WILLIAM W. DYER, Jr., *Primary Examiner.*

W. D. BRAY, *Assistant Examiner.*